June 11, 1935.  H. T. THOMAS  2,004,385
DELIVERY VEHICLE
Filed Jan. 9, 1933   3 Sheets-Sheet 1
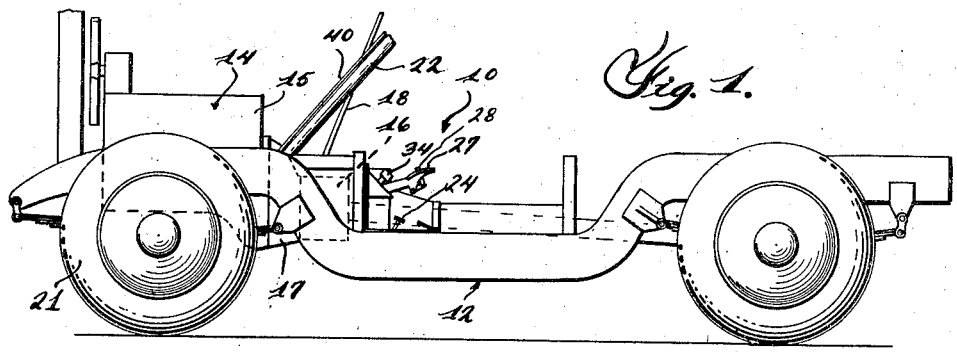
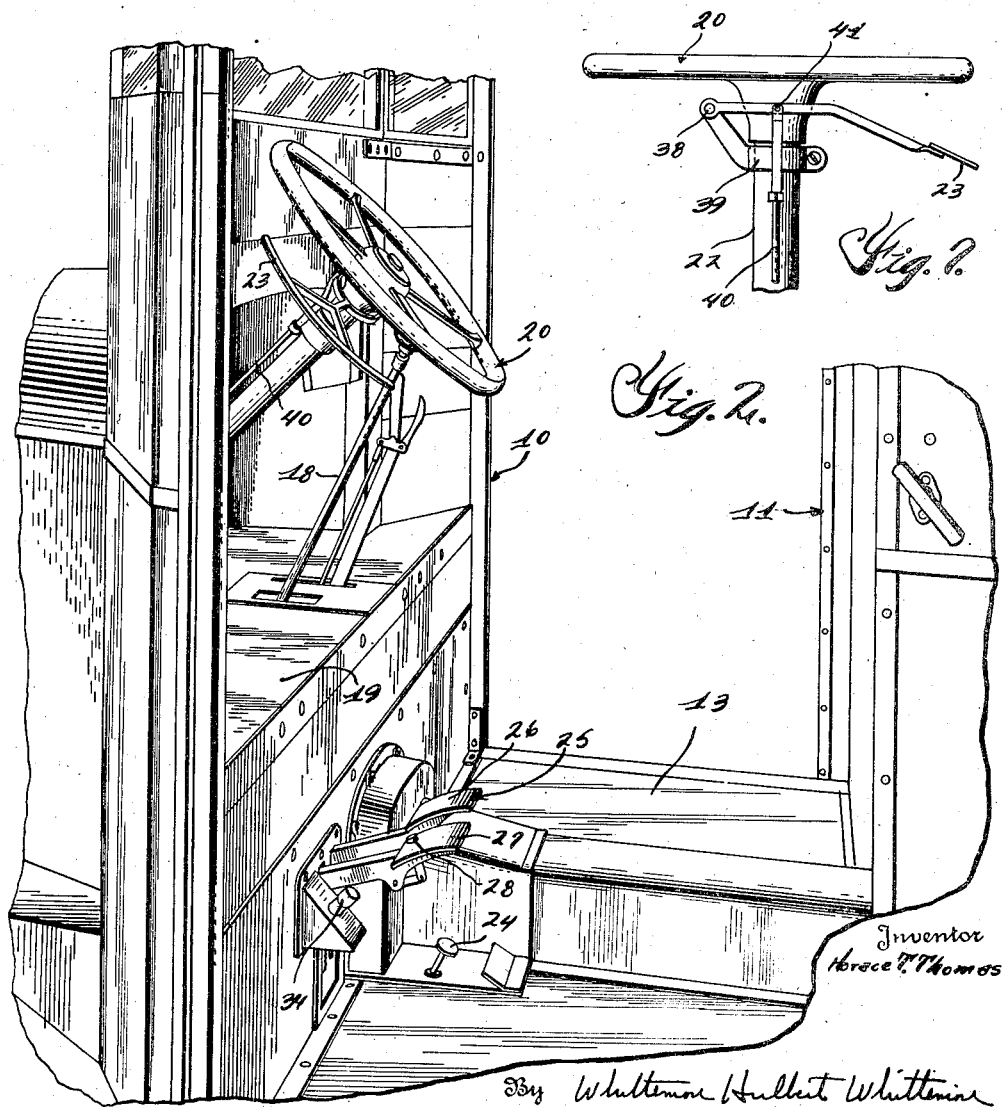

June 11, 1935.  H. T. THOMAS  2,004,385
DELIVERY VEHICLE
Filed Jan. 9, 1933  3 Sheets-Sheet 2
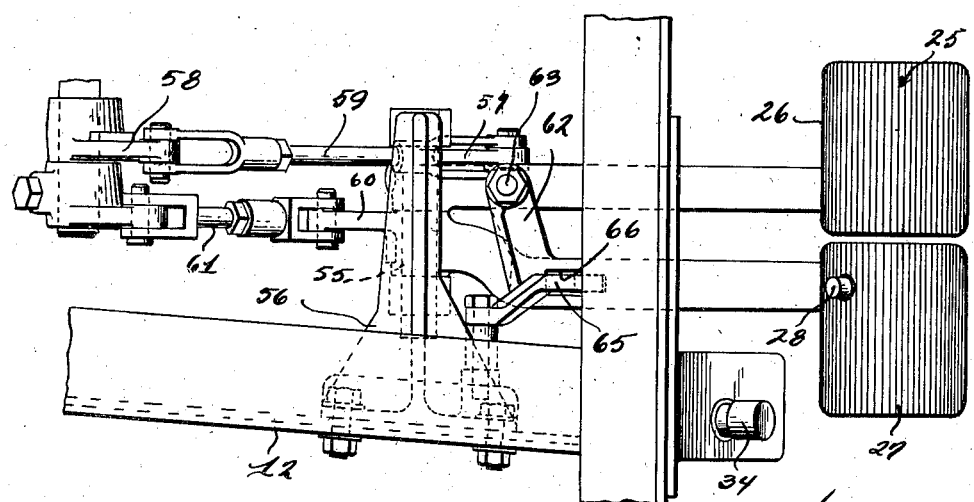
Inventor
Horace T. Thomas
By Whittemore, Hulbert, Whittemore & Belknap
Attorneys June 11, 1935. H. T. THOMAS 2,004,385
DELIVERY VEHICLE
Filed Jan. 9, 1933 3 Sheets-Sheet 3
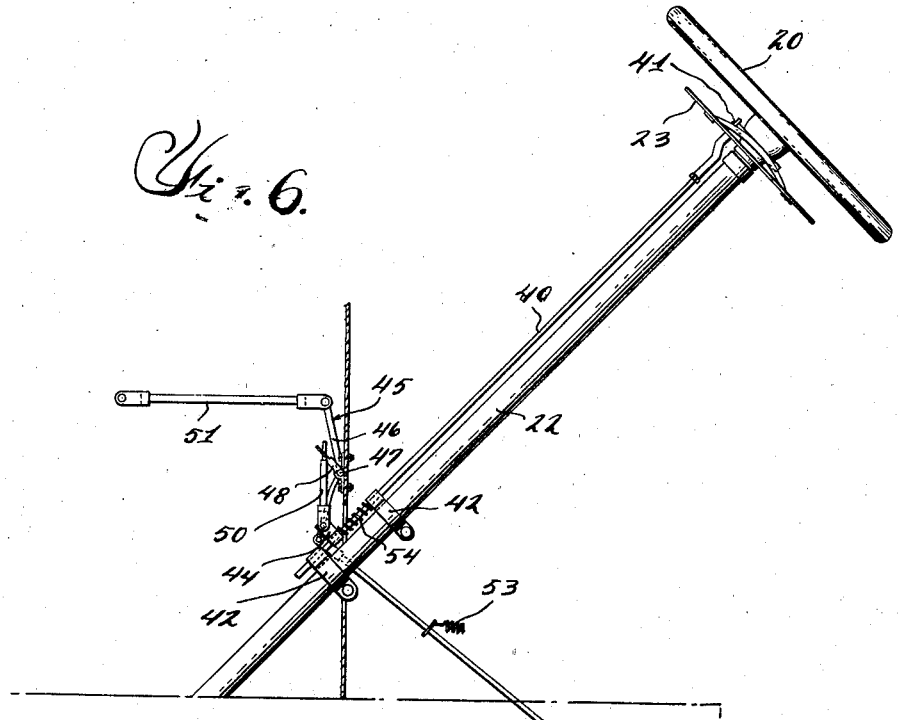
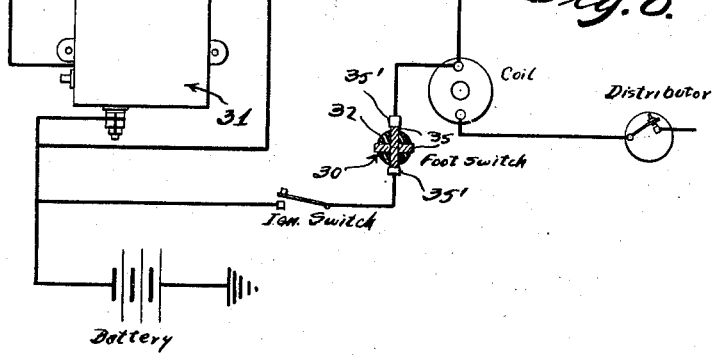
Inventor
Horace T. Thomas
By Whittemore Hulbert Whittemore
 & Belknap Attorneys Patented June 11, 1935

2,004,385

UNITED STATES PATENT OFFICE 2,004,385

DELIVERY VEHICLE

Horace T. Thomas, Lansing, Mich., assignor to Reo Motor Car Company, Lansing, Mich., a corporation of Michigan Application January 9, 1933, Serial No. 650,920

2 Claims. (Cl. 180—77)

This invention relates generally to commercial vehicles and refers more particularly to improvements in delivery vehicles of the type employed on routes requiring frequent stops.

Although this invention may be used to advantage in connection with practically any type of delivery vehicle employed on routes necessitating frequent stops, nevertheless, it finds particular utility when associated with delivery vehicles of the type having passageways extending transversely therethrough at substantially curb level. Vehicles of the above character have achieved considerable recognition in the trade due to the facility with which the low level passageway therethrough permits the operator to enter or leave the driver's compartment from either side of the vehicle, and it is one of the principal objects of this invention to further expedite deliveries as well as materially simplify the operation of such vehicles by a novel arrangement of controls.

The present invention contemplates simplifying and expediting the operation of delivery vehicles by providing a hand-operated accelerator adjacent the steering wheel of the vehicle distinguished from the conventional throttle construction in that it is simpler to operate and responds more readily to accomplish its intended purpose. In the specific embodiment of the invention, the hand-operated throttle is movable toward and away from the rim of the steering wheel to control the speed of the engine and is so positioned with respect to the wheel as to permit the operator to regulate the speed of the vehicle as well as the direction of travel thereof by the use of only one hand.

Another object of this invention which not only provides for obtaining increased economy, but at the same time reduces the liability of theft of the vehicle during the absence of the operator resides in the provision of means controlled by one foot of the operator for closing an electric circuit to the starting motor to crank the engine and for breaking the ignition circuit to discontinue operation of the engine. In accordance with the present invention, both the aforesaid functions are accomplished by successive operations of a foot-operated switch located at a convenient point within the driver's compartment so that the time required to operate the same is negligible.

A further object of this invention which also provides for expediting the operation of the vehicle consists in the provision of a single depressible pedal operable upon depressing the same throughout a predetermined range of travel to successively disengage the clutch and apply the brakes of the vehicle. In conjunction with the foregoing, the factor of safety of the vehicle is materially increased by providing means responsive to movement of the pedal through the brake applying range thereof to latch the brake in applied position.

A still further feature of the present invention resides in the provision of a release for the aforesaid brake locking means including a control so positioned with respect to the clutch pedal as to permit simultaneous engagement of both by one of the operator's feet, with the result that releasing of the brakes and re-engaging the clutch, after the necessary shifting of the change speed gears in the transmission, may be effected with one operation. By the same token, the vehicle may be brought to a stop by manipulation of the clutch pedal only, and while the latching means is responsive to movement of the clutch pedal, nevertheless, it is not an evitable or necessary result thereof since as long as a pressure is maintained on the control for the release, operation of the latching means is prevented.

The foregoing as well as other objects will be made more apparent as this description proceeds, especially when considered in connection with the accompanying drawings, wherein:

Figure 1 is a side elevational view of a chassis constructed in accordance with this invention;

Figure 2 is a fragmentary perspective view of a delivery vehicle illustrating the driver's compartment;

Figure 3 is a longitudinal sectional view through a portion of the vehicle illustrating the combined clutch and brake control mechanism;

Figure 4 is a plan view of the construction shown in Figure 3;

Figure 5 is a diagrammatic view illustrating the foot-operated ignition switch;

Figure 6 is a diagrammatic view featuring the throttle control system;

Figure 7 is a fragmentary side elevational view of the steering wheel of the vehicle showing the relationship of the hand-operated throttle thereto;

Figure 8 features a wiring diagram which may be employed in association with the foot-operated ignition switch.

Referring now to the drawings, it will be noted that I have illustrated therein a motor delivery vehicle 10 having a body 11 suitably supported upon a chassis frame 12 of the drop center type providing for extending a low level platform 13 transversely through the vehicle in order to afford standing height clearance beneath the top of the latter which is preferably of ordinary height. Supported upon the chassis frame in advance of the low level platform 13 is a power plant 14 of conventional design comprising an internal combustion engine 15, a variable speed transmission 16 and a clutch assembly 17 operatively connecting the engine to the transmission. The transmission is capable of being controlled from a standing position upon the platform 13 by means of a suitable shift lever 18 extending upwardly from the transmission through the shelf 19 in advance of the low level platform and in juxtaposition to the steering wheel 20. The steering wheel 20 is operatively connected to the front steering wheels 21 of the vehicle by the usual mechanism and is supported through the medium of a column 22 in a position to be conveniently grasped by an operator standing on the platform 13. Mounted upon the supporting column 22 in a manner to be presently described is a hand-operated throttle control 23 which may or may not operate in conjunction with the foot accelerator 24 on the platform for regulating the speed of the internal combustion engine. In any event, the control 23 is operatively connected to the throttle (not shown) of the engine in such a manner that movement of the same upwardly in the direction of the column opens the throttle, while downward movement thereof to close the throttle is effected automatically through the medium of a suitable spring to be more fully hereinafter set forth. It will also be noted that the throttle control, in addition to being located slightly below the rim of the steering wheel in order to permit manipulation of both the latter by one hand of the operator, is also positioned on the side of the steering wheel opposite the side upon which the gear shift lever is supported so as to permit operation of the latter lever by the other hand of the operator. This arrangement materially facilitates and simplifies the operation of the vehicle from a standing position on the platform 13.

The brakes associated with the wheels of the vehicle are not shown herein in detail, but are of conventional design and are operated in the usual manner by means of a brake pedal 25 having a foot engaging portion 26 extending into the transverse aisle above the platform 13 for convenient manipulation by the operator. In the present instance, the wheel brakes are also operatively connected to the clutch pedal 27 having the forward end connected to the clutch mechanism for actuating the same and having a foot engaging portion at the rear end extending into the aisle in juxtaposition to the brake pedal 25. As will be more fully hereinafter set forth, the connection between the clutch pedal and wheel brakes of the vehicle is such that initial movement of the clutch pedal downwardly effects a disengagement of the clutch mechanism, and continued downward movement thereof locks the brakes in applied position through suitable ratchet mechanism releasable upon manipulation of a control 28 located for simultaneous operation with the clutch pedal.

In addition to the foregoing, the economy as well as the safety factor of the vehicle is greatly increased by providing a unique arrangement whereby the ignition circuit may be broken prior to leaving the vehicle and completed to start the engine when it is desired to resume operation of the vehicle without instituting an appreciable loss of time. For accomplishing the foregoing results, a two-way starting switch 30 is located within the aisle for manipulation by the operator's foot and this switch is preferably of the plunger type so as to permit actuation of the same with the maximum expediency. As will be observed from the wiring diagram in Figure 8, the plunger switch 30 is arranged in the ignition circuit with a suitable self-starting device designated generally herein by the reference character 31. This device forms no part of the present invention, and may be any one of the well known standard constructions wherein closing of the ignition circuit automatically closes the circuit to the starting motor until the latter has accomplished its purpose of successfuly cranking the engine. By employing a device of the general type set forth above in the ignition circuit, it is only necessary to open and close this circuit in order to control the operation of the engine, and as previously stated, this is accomplished by the provision of a two-way plunger type switch constructed in such a manner that successive operations thereof breaks and completes the ignition circuit. Any one of a number of different types of two-way switches may be employed for accomplishing the function set forth, but for the purpose of illustration, I have shown the same herein as comprising a rotatable contact disk 32 having ratchet teeth 33 thereon operatively connected to the plunger 34 through the medium of a pawl 34' in such a manner that successive operations of the plunger impart an intermittent rotative movement to the disk. The disk in turn is provided with a plurality of circumferentially spaced contacts 35 operable upon rotation of the disk to successively bridge the space between the contacts 35' and thereby close the ignition circuit.

The circumferential space between the ends of the contacts 35 is so determined with respect to the number and spacing of the ratchet teeth that successive movements of the plunger makes and breaks the ignition circuit. Assuming the circuit is closed, or, in other words, that one of the contacts 35 is in a position wherein the space between the contacts 35' is bridged thereby, it will be noted that depressing the plunger against the action of the spring 36 effects a rotative movement of the disk to such an extent as to break the ignition circuit whereupon operation of the engine is discontinued. Return movement of the plunger under the action of the spring 36 engages the inner end of the same with the next adjacent ratchet tooth on the disk, with the result that when it is desired to resume operation of the engine, the plunger is again depressed causing a sufficient rotative movement of the disk to bring the next adjacent contact 35 into engagement with the contacts 35' to close the circuit. Inasmuch as the switch is employed in association with a self-starting electrical device of the type outlined above, it will be apparent that as soon as the ignition circuit is closed, the engine will be cranked by the starting motor. The above construction provides for obtaining the maximum operating economy and contributes materially to the safety factor of the vehicle without noticeably increasing the length of time required to make deliveries.

Reference has briefly been made in the previous description to new and improved hand throttle operation which materially facilitates controlling the vehicle. The operative connection provided herein between the throttle control 23 and throttle (not shown) of the engine is featured in Figure 6 of the drawings. In detail, the throttle control lever is pivotally connected as at 38 to a bracket 39 fixed to the steering wheel post 22 so as to permit swinging movement of the free end of the lever toward and away from the rim of the steering wheel. As stated above, movement of the free end of the control lever toward the rim of the steering wheel effects an opening of the throttle to the engine, and for accomplishing this result, I provide a rod 40 pivotally connected at its upper end as at 41 to the lever 23 intermediate the ends of the latter and slidably supported at its lower end for reciprocatory movement in the direction of the steering post 22 by means of a pair of brackets 42 spaced longitudinally of the post and fixed thereto. Secured to the portion of the rod 40 between the supports 42 therefor is a suitable lug 44 which in turn is connected to the throttle (not shown) of the engine through suitable linkage designated generally by the reference character 45. The linkage 45 comprises a lever 46 pivotally connected intermediate the ends thereof to the dash of the vehicle as at 47 and having an intermediate forwardly extending arm 48 for engaging the upper end of a link 50 extending from the lug 44. The upper end of the lever 46 is operatively connected to the throttle (not shown) of the engine by a link 51, with the result that movement of the rod 40 upwardly with respect to the steering post 22 by the control lever 23 will effect a rotative movement of the lever 46 to open the throttle through the action of the link 50 as the lower end thereof travels upwardly with the rod. In the present instance, the lower end of the lever 46 is operatively connected to the foot-actuated accelerator 24 so that depression of the latter will also impart a rotative movement to the lever to open the throttle, and in this connection, it is to be noted that the engagement between the arm 48 and link 50 is such as to permit manipulation of the throttle by the foot-operated accelerator without correspondingly operating the hand throttle control lever. A suitable spring 53 is provided for normally maintaining the foot-operated accelerator in a position wherein the throttle is closed, and for the same purpose, I provide a spring 54 encircling the rod 40 between the lug 44 and uppermost bracket support 42.

In the previous description, reference was also briefly made to the fact that the clutch pedal, aside from performing its usual function of disengaging the clutch mechanism, also serves to apply the brakes of the vehicle and to latch the brakes in applied position. Referring now more in detail to the construction which provides for obtaining the foregoing results and with special reference to Figures 3 and 4, it will be noted that the forward ends of both the clutch and brake pedals are pivotally mounted upon a suitable stub shaft 55 supported from the chassis frame by a bracket 56. The forward end of the brake pedal 25 is provided with an extension 57 depending from the journal for the pedal upon the stub shaft and having the free end thereof operatively connected to a rock arm 58 through the intermediary of suitable linkage 59. The rock arm 58 is in turn connected to the several wheel brakes of the vehicle in any suitable manner so that depressing the brake pedal results in an application of the wheel brakes through the linkage hereinbefore set forth. The forward end of the clutch pedal, on the other hand, is provided with an extension 60 having the lower end operatively connected to the clutch mechanism through suitable linkage 61 and having a lug 62 extending laterally therefrom between the point of pivotal support therefor and the rear end or foot engaging portion thereof. This extension projects over the adjacent portions of the brake operating pedal 25 and is provided with an adjustable abutment 63 in the form of a screw having the lower end located to engage the brake pedal at a point in rear of its pivotal support 55 upon predetermined downward movement of the clutch pedal. The arrangement is such that initial downward movement of the clutch pedal about its pivotal support disengages the clutch mechanism, and continued movement thereof effects a corresponding movement of the brake pedal through the action of the adjustable abutment 63 to apply the brakes.

The means for locking the brakes in applied position comprises a segment 65 extending vertically through a slot 66 formed in the clutch pedal and having the ends rigidly secured to any suitable fixed part of the chassis. The rear edge of the segment 65 is formed with a plurality of ratchet teeth 67 thereon for engagement with a suitable pawl 68 which in turn is pivotally mounted upon the clutch pedal as at 69 for swinging movement toward and away from the ratchet teeth. The free end of the pawl 68 is operatively connected to one arm 70 of a bell crank lever 71 pivotally connected intermediate the ends as at 72 to the clutch pedal 27 adjacent the rear end thereof for swinging movement about an axis substantially parallel to the axis of pivotal movement of the dog 69. The connection between the free end of the dog and arm 70 of the bell crank lever is accomplished herein by means of a link 73 slidably mounted within a bearing 74 formed on the clutch pedal and normally urged in a direction to engage the free end of the dog with the ratchet by means of a spring 75 encircling the link 73 between the bearing and a fixed abutment 76 thereon. The other arm 77 of the bell crank lever is operatively connected to a plunger 28 which in turn is reciprocably mounted in the foot engaging portion of the clutch pedal 27 and normally projects above the upper surface of the latter. The construction is such that downward movement of the plunger 28 effects a swinging movement of the free end of the dog away from the ratchet to release the brakes and permit the clutch pedal to assume its normal position under the action of a spring 80 shown in Figure 3 of the drawings.

With the construction as set forth above, it will be seen that when the operator desires to stop the vehicle with a view to making a delivery, the clutch pedal is depressed by engaging the same at a point spaced from the plunger 28 so as not to depress the latter relative to the pedal. When the clutch pedal is depressed in the foregoing manner, the same functions to disengage the clutch, apply the brakes and lock the latter in applied position. In the event it is desired to make an emergency stop, the operator engages the clutch pedal in such a manner as to also depress the plunger 28 and thereby render the latch mechanism inoperative, or in other words, permit the clutch pedal to be immediately returned to its normal position. It will of course be understood that when it is desired to merely slow down the vehicle by the use of the brakes, the latter are applied through the medium of the brake pedal without disturbing the clutch pedal or latch mechanism. The above arrangement in conjunction with the hand-operated throttle leaves one foot of the operator free at all times to support his weight on the driver's platform, and, as a consequence, materially facilitates operation of the vehicle as well as increases the factor of safety thereof.

What I claim as my invention is:

1. The combination of a delivery vehicle having a low level driving platform extending transversely therethrough and propelled by an internal combustion engine, clutch and transmission and including brake mechanism and vehicle control means, said control means comprising a steering wheel disposed forwardly of said driving platform, a throttle lever adjacent thereto and so positioned with respect to said steering wheel as to permit actuation of both by one hand of the operator while standing on said low level driving platform, a brake pedal, a combined clutch and brake pedal, a foot actuated two-way starting and stopping switch pedal for the engine and an accelerator pedal, all of said pedals being disposed in the forward portion of said driving platform adjacent to one another and accessible to the operator while standing on said driving platform.

2. The combination of a delivery vehicle having a low level driving platform extending transversely therethrough and propelled by an internal combustion engine, clutch and transmission and including brake mechanism and vehicle control means, said control means comprising a steering wheel disposed forwardly of said driving platform, a throttle lever adjacent thereto and so positioned with respect to said steering wheel as to permit actuation of both by one hand of the operator while standing on said low level driving platform, a brake pedal, a clutch pedal, said brake pedal and clutch pedal being disposed in juxtaposed relation, a foot actuated two-way starting and stopping switch pedal for the engine and an accelerator pedal, all of said pedals being disposed in the forward portion of said driving platform adjacent to one another and accessible to the operator while standing on said driving platform.

HORACE T. THOMAS.